US009247427B2

(12) United States Patent
Perez

(10) Patent No.: US 9,247,427 B2
(45) Date of Patent: Jan. 26, 2016

(54) MULTI-FACTOR CALLER IDENTIFICATION

(71) Applicant: Verizon Patent and Licensing Inc., Basking Ridge, NJ (US)

(72) Inventor: John S. Perez, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 113 days.

(21) Appl. No.: 13/953,402

(22) Filed: Jul. 29, 2013

(65) Prior Publication Data

US 2015/0030156 A1  Jan. 29, 2015

(51) Int. Cl.
*H04L 9/00* (2006.01)
*H04W 12/06* (2009.01)
*H04L 29/06* (2006.01)

(52) U.S. Cl.
CPC ........... *H04W 12/06* (2013.01); *H04L 63/0428* (2013.01)

(58) Field of Classification Search
None
See application file for complete search history.

(56) References Cited

U.S. PATENT DOCUMENTS

| 2009/0217039 A1* | 8/2009 | Kurapati et al. | 713/168 |
| 2011/0135091 A1* | 6/2011 | Radatti | 380/247 |
| 2013/0170361 A1* | 7/2013 | Manyakin et al. | 370/241 |
| 2014/0187203 A1* | 7/2014 | Bombacino et al. | 455/411 |

* cited by examiner

*Primary Examiner* — Jeffrey Pwu
*Assistant Examiner* — Helai Salehi

(57) ABSTRACT

A method and apparatus for authenticating directory information is described. The method includes: receiving a request to initiate a voice communication session over a signaling network that includes a data network, the request including directory information specifying origination of the voice communication session; determining verification information associated with the directory information; authenticating the directory information using the determined verification information; and selectively providing notification of the authentication for handling of the voice communication session.

18 Claims, 13 Drawing Sheets

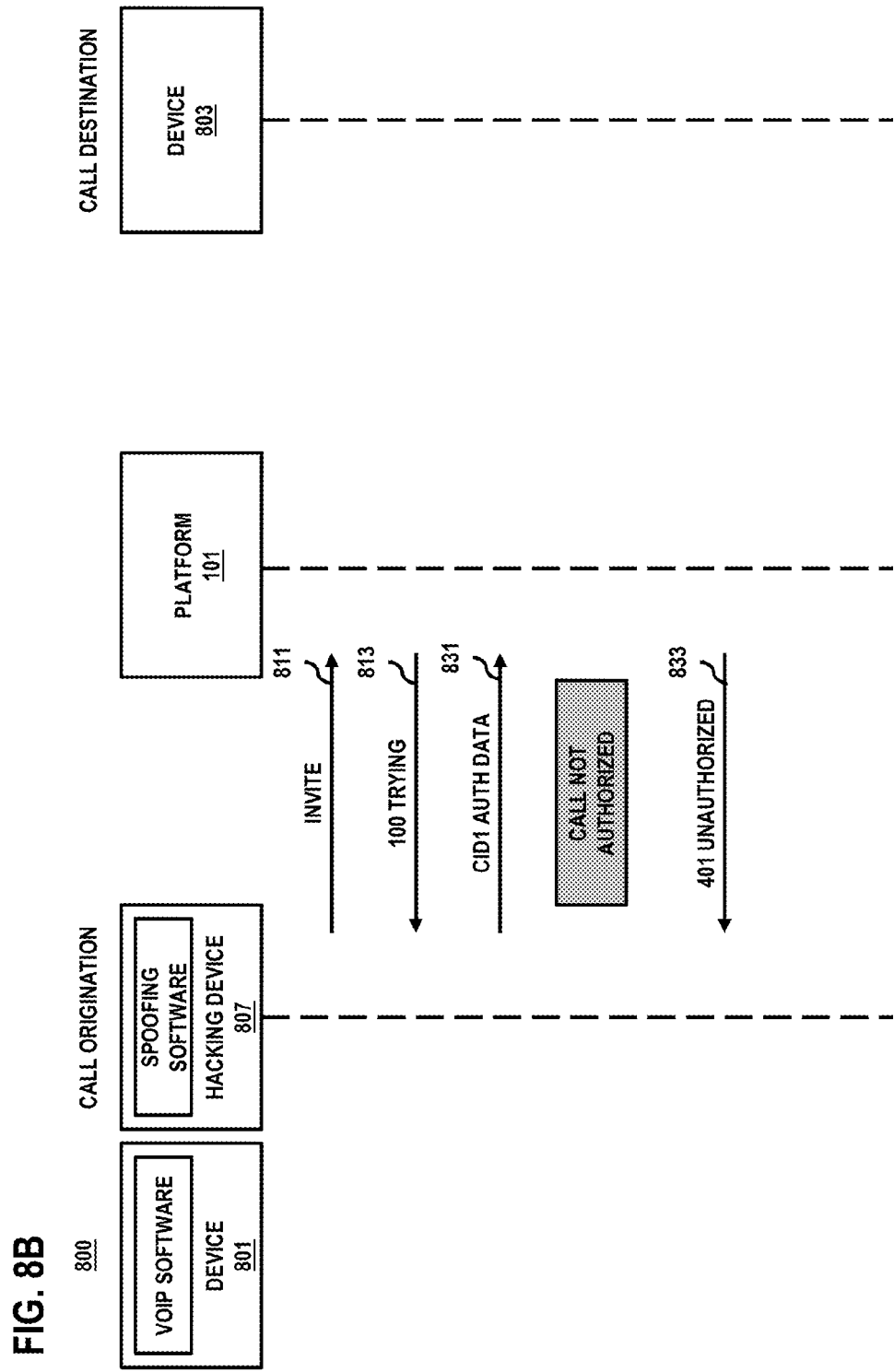

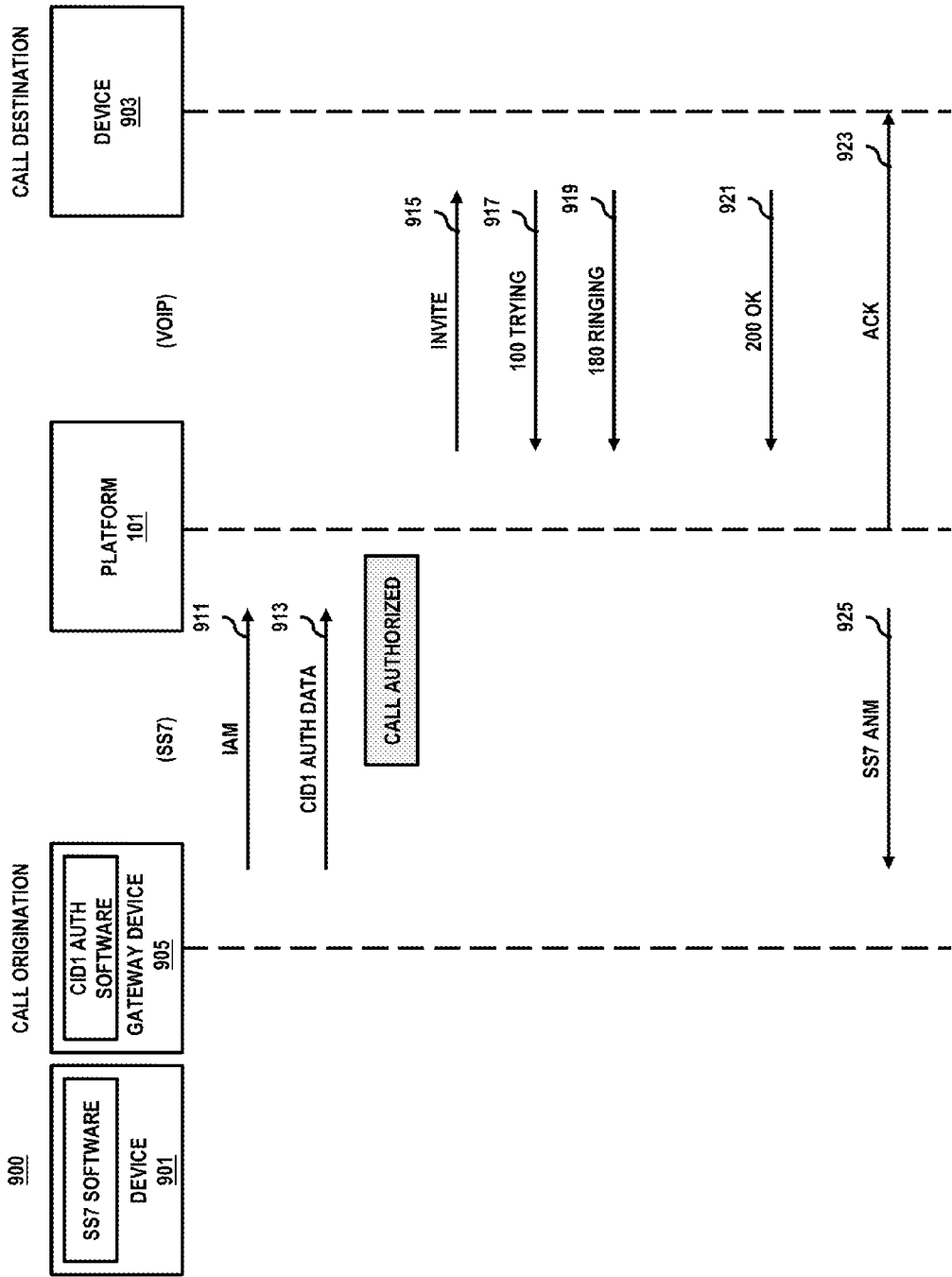

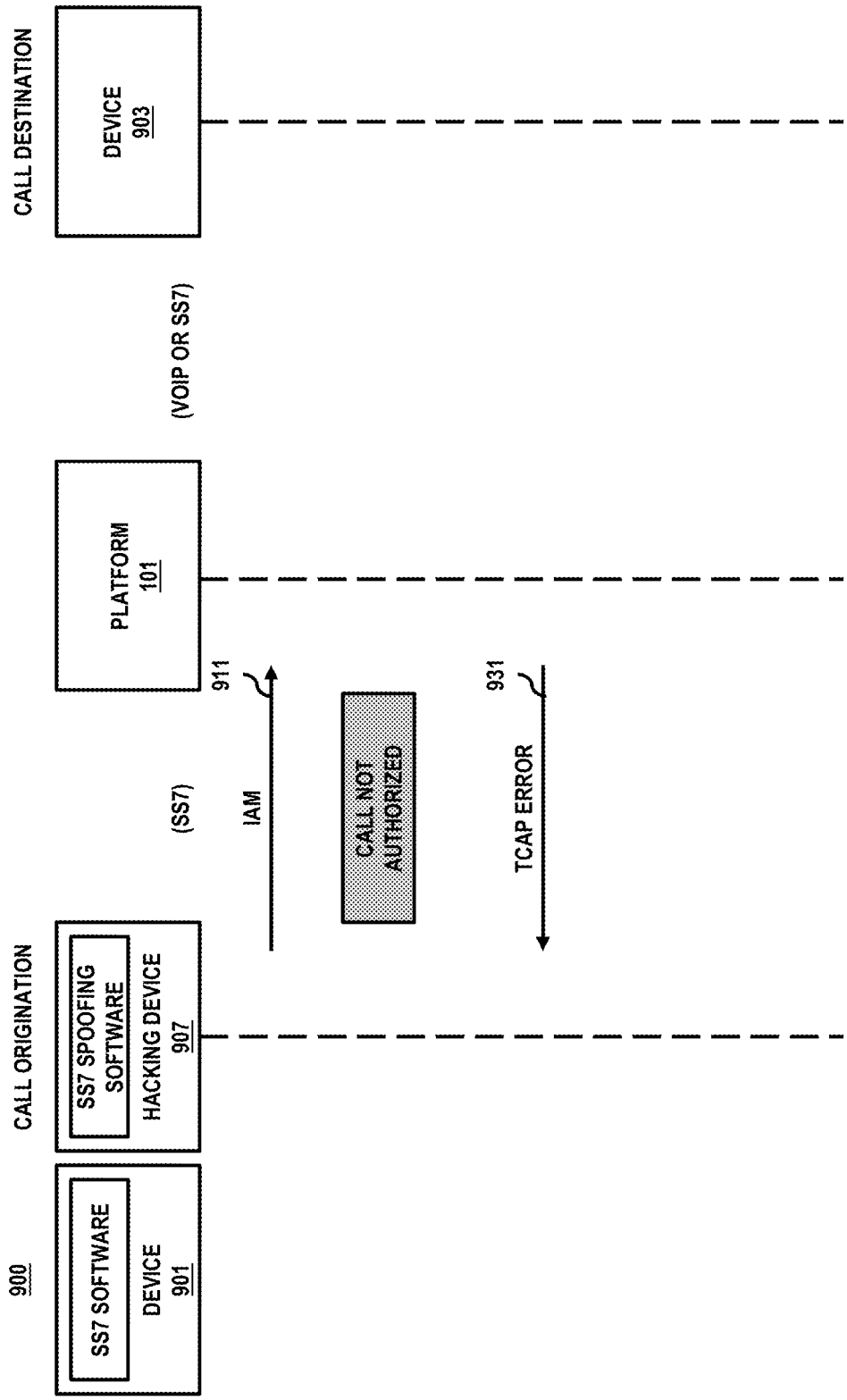

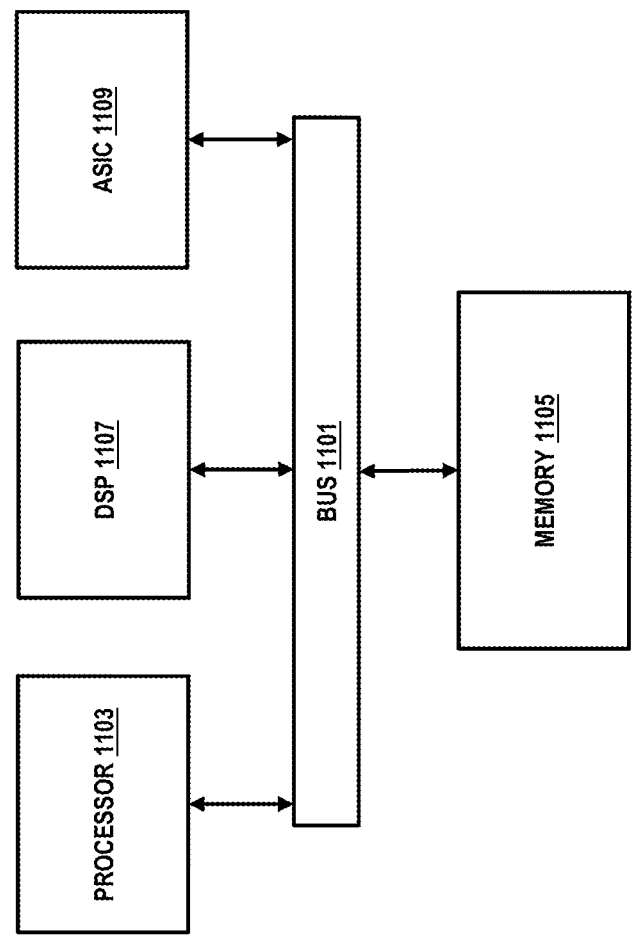

MULTI-FACTOR CALLER IDENTIFICATION

BACKGROUND INFORMATION

Networking technologies using internet protocol (IP) technologies offer users the flexibility to handle video, data, and voice. Additionally, IP technologies operate at a reduced cost than other telecommunication technologies, for instance, signaling system v7 (SS7). However, IP technologies, such as voice over IP (VoIP), session initiation protocol (SIP), session description protocol (SDP), and the like, may be exploited. For instance, directory information, such as an automatic number indicator (ANI), also known as "caller ID" of a calling party may be falsified using an ANI exploit. Such directory information is frequently relied upon by users to identify a calling party and by network service providers to identify a billing account.

Therefore, there is a need for approaches to authenticate directory information specifying origination (e.g., ANI) of a voice communication session, particularly for voice communication sessions over a signaling network (e.g., VoIP, SS7, etc.).

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 8A and 8B are ladder diagrams illustrating an exemplary system utilizing VoIP, according to exemplary embodiments;

FIGS. 9A and 9B are ladder diagrams illustrating an exemplary system utilizing the SS7 protocol, according to exemplary embodiments;

FIG. 11 is a diagram of a chip set that can be used to implement various exemplary embodiments.

DESCRIPTION OF THE PREFERRED EMBODIMENT

A preferred method and system for authenticating directory information is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
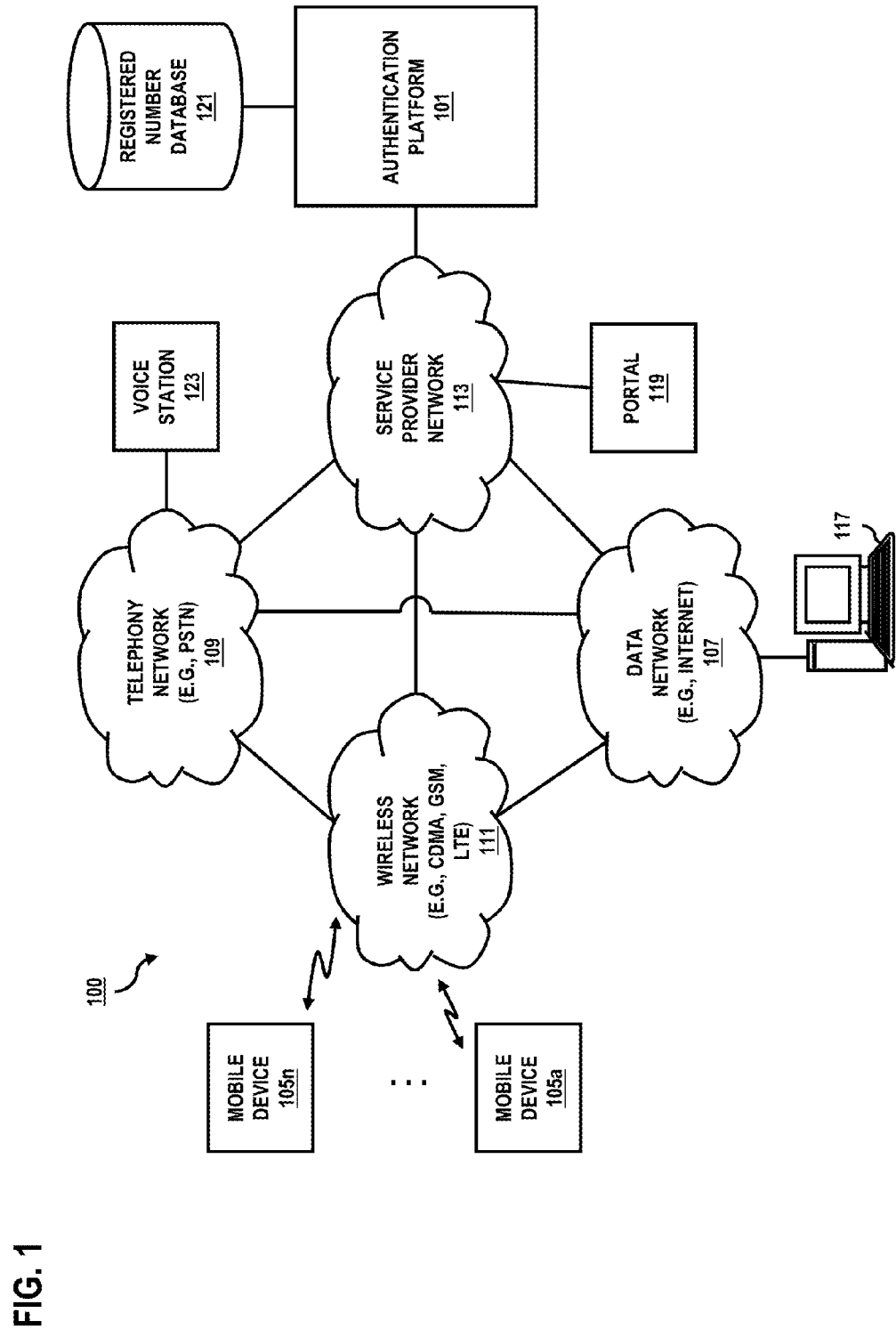
FIG. 1 is a diagram of a communication system capable of authenticating directory information, according to various embodiments.

FIG. 1 is a diagram of a communication system capable of authenticating directory information, according to various embodiments. For illustrative purposes, system 100 is described with respect to an authentication platform (platform) 101. In this example, the platform 101 is configured to authenticate directory information of a communication session between devices of the system 100. For example, the platform 101 authenticates directory information (e.g., a "caller ID") indicating mobile device 105a by comparing verification information previously registered to mobile device 105a with verification information of a request to initiate a communication session (e.g., telephone call). In this manner, the platform 101 is configured to authenticate directory information to ensure accurate "caller ID" and to ensure that an appropriate billing party is identified. Furthermore, the platform 101 may be configured to deny access to one or more networks 107-113 when registered directory information is not authenticated. Frequently fraudulent activity utilizes spoofed directory information. As such, the platform 101 may prevent attacks to the one or more networks 107-113.

In certain embodiments, users (e.g., customers) may utilize a computing device 117 (e.g., laptop, desktop, web appliance, netbook, etc.) to access platform 101 via service provider portal 119. Service provider portal 119 provides, for example, a web-based user interface to allow users to register one or more devices using the platform 101.

As mentioned, users (e.g., customers) may be faced with falsified directory information. Previous systems existing on circuit switched networks, for instance, using the SS7 protocol, were operated by telecommunications providers to prevent falsified directory information. The evolution of voice communications has expanded such systems to include VoIP and packet based networks. However, such evolutions have caused vulnerabilities allowing directory information to be falsified. Such vulnerabilities have been exacerbated by expanding the operation of networks (e.g., 107-113) outside the telecommunications providers. For instance, enterprise customers utilizing an integrated services digital network (ISDN) primary rate interface (PRI) trunk may configure access to maximize a number of users, at the expense of security.

To address this issue, the system 100 of FIG. 1 introduces the capability to authenticate directory information of requests to initiate a voice communication session. By way of example, a telecommunications provider provides a customer with a telephone number and verification information for the telephone number from registered number database 121. As such, requests to initiate a voice communication session that indicate the telephone number and verification information can be compared with the verification information provided by the telecommunications provider. Thus, many attempts to falsify directory information may be identified. Furthermore, such attempts frequently involve criminal activities, for instance, attempting to obtain credentials (e.g., vishing, phishing, etc.). As such, users may be further protected from such criminal behavior. Indeed, Congress has passed the Truth in Caller ID Act in 2010 to criminalize, in some cases, attempts to falsify directory information.

As used herein directory information includes, for example, a person's name, addresses, telephone numbers, and the like. In some embodiments, the directory information is publically available and maintained by a consortium of, for example, local exchange carriers (LEC). The LECs may interact with the Number Portability Administration Center (NPAC) to facilitate modal and intermodal porting of directory information between, for instance, wireline, wireless, and other types of services.

As used herein, mobile devices 105 may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that the mobile devices 105 may support any type of interface for supporting the presentment or exchange of data. In addition, mobile devices 105 may facilitate various input means for receiving and generating information, including touch screen capability, keyboard and keypad data entry, voice-based input mechanisms, accelerometer (e.g., shaking the mobile device 105), and the like. Any known and future implementations of mobile devices 105 are applicable. It is noted that, in certain embodiments, the mobile devices 105 may be configured to transmit information (e.g., audio signals, words, address, etc.) using a variety of technologies—e.g., NFC, BLUETOOTH, infrared, etc. Also, connectivity may be provided via a wireless local area network (LAN). By way of example, a group of mobile devices 105 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 105, e.g., IP addresses that are accessible to devices connected to the service provider network 113 as facilitated via a router.

In some embodiments, platform 101, the mobile devices 105, and other elements of the system 100 may be configured to communicate via the service provider network 113. According to certain embodiments, one or more networks, such as the data network 107, the telephony network 109, and/or the wireless network 111, may interact with the service provider network 113. The networks 107-113 may be any suitable wireline and/or wireless network, and be managed by one or more service providers. For example, the data network 107 may be any local area network (LAN), metropolitan area network (MAN), wide area network (WAN), the Internet, or any other suitable packet-switched network, such as a commercially owned, proprietary packet-switched network, such as a proprietary cable or fiber-optic network. For example, computing device 117 may be any suitable computing device, such as a VoIP phone, skinny client control protocol (SCCP) phone, session initiation protocol (SIP) phone, IP phone, personal computer, softphone, workstation, terminal, server, etc. The telephony network 109 may include a circuit-switched network, such as the public switched telephone network (PSTN), an integrated services digital network (ISDN), a private branch exchange (PBX), or other like network. For instance, voice station 123 may be any suitable plain old telephone service (POTS) device, facsimile machine, etc. Meanwhile, the wireless network 111 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 107-113 may be completely or partially contained within one another, or may embody one or more of the aforementioned infrastructures. For instance, the service provider network 113 may embody circuit-switched and/or packet-switched networks that include facilities to provide for transport of circuit-switched and/or packet-based communications. It is further contemplated that the networks 107-113 may include components and facilities to provide for signaling and/or bearer communications between the various components or facilities of the system 100. In this manner, the networks 107-113 may embody or include portions of a signaling system 7 (SS7) network, Internet protocol multimedia subsystem (IMS), or other suitable infrastructure to support control and signaling functions.

While specific reference will be made thereto, it is contemplated that the system 100 may embody many forms and include multiple and/or alternative components and facilities.

Figure 2:
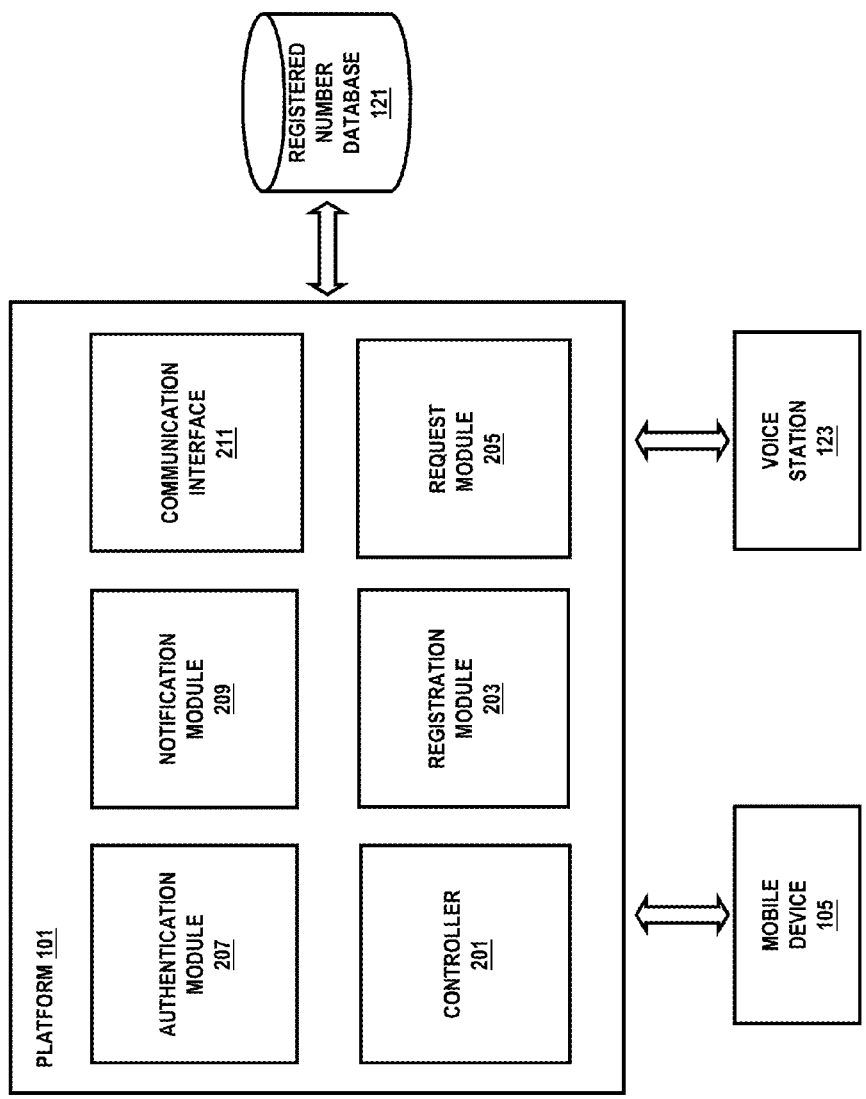
FIG. 2 is a diagram of the components of platform 101, according to one embodiment.

FIG. 2 is a diagram of the components of platform 101, according to one embodiment. The platform 101 may comprise computing hardware (such as described with respect to FIGS. 10 and 11), as well as include one or more components configured to execute the processes described herein for authenticating directory information. It is contemplated that the functions of these components may be combined in one or more components or performed by other components of equivalent functionality. In one implementation, platform 101 includes a controller 201, registration module 203, request module 205, authentication module 207, notification module 209, and communication interface 211.

The controller 201 executes at least one algorithm for executing functions of platform 101. For example, the controller 201 may interact with the communication interface 211 to determine directory information and verification information. The controller 201 may then interact with the mobile devices 105 and the one or more networks 107-113 to cause, for instance, authentication of directory information and to selectively provide notification of the authentication.

The registration module 203 associates directory information (e.g., a telephone number) with verification information. The directory information may indicate, for instance, a caller ID value, an ANI number (for SS7) a P-asserted ID (for VOIP) and the like. By way of example, the registration module 203 maintains registered number database 121 to correspond directory information (e.g., "caller ID" and ANI/P-asserted ID) with verification information. As discussed above, users (e.g., customers) may register directory information with service providers for the purpose of providing authentic "caller ID" services. The registration module 203 may continually or periodically update the verification information. For instance, the registration module 203 updates a current key for a telephone number (e.g., CID1) at a first frequency (e.g., daily, hourly, etc.) and a second key (e.g., CID2) used to decrypt the first key at a second frequency (e.g., weekly, bi-weekly, every 12-hours, etc.). As such, the first and second frequencies can be configured to prevent exploits attempting to trace and "replay" a device in addition to adjusting a key size and algorithm used for the first and second keys. Furthermore, the second key may be managed by a non-standard proprietary scheme by the LECs and may involve, for example, embedded device serial numbers in conjunction with a network. Additionally, or alternatively, a third key may be used to conceal communications between devices. The third key may be preloaded on devices, salted with serial numbers, etc. and may continually or dynamically change.

The request module 205 determines directory information from requests to initiate a voice communication session. In one embodiment, the request module 205 decrypts an encrypted first key value of the request with a second key value to allow, for instance, the authentication module 207, to compare the decrypted first key value with verification information maintained by registration module 203 in the database 121.

Authentication module 207 authenticates directory information of requests to initiate a voice communication session using verification information. In one embodiment, the authentication module 207 compares verification information of a request indicating directory information with verification information of registered number database 121 corresponding with the directory information. As noted above, the verification information may be retrieved from the request as encrypted, then decrypted, and subsequently compared by the authentication module 207 with verification information of registered number database 121. In one example, the verification information includes an identifier (e.g., integer key) for Backoffice search purposes and a current key for a telephone number (e.g., CID1) that can be encrypted by a cipher of a calling device. Further, a second key (e.g., CID2) for a LEC may be used to decrypt the cipher. Additionally, or alternatively, the authentication module 207 determines a communication device is authenticated by a trusted network and authenticates the directory information based on the authentication by the trusted network.

Notification module 209 selectively provides notification of authentication for handling of a voice communication session. For example, notification module 209 appends a request to indicate whether the directory information is authenticated/authorized or unauthenticated/unauthorized and forwards the request to the one or more networks 107-113. In some instances, notification module 209 may provide the notification by forwarding of or initiating a forwarding of the request to the one or more networks 107-113.

Communication interface 211 communicates with other components of platform 101, the mobile devices 105, and other components of the system 100. The communication interface 211 may include multiple means of communication. For example, the communication interface 211 may be able to communicate over short message service (SMS), multimedia messaging service (MMS), internet protocol, instant messaging, voice sessions (e.g., via a phone network), email, NFC, QR code, or other types of communication. Additionally, communication interface 211 may include a web portal (e.g., service provider portal 119) accessible by, for example, mobile device 105, computing device 117, and the like.

It is contemplated that to prevent unauthorized access, platform 101 may include an authentication identifier when transmitting signals to and from mobile devices 105. For instance, control messages may be encrypted, either symmetrically or asymmetrically, such that a hash value can be utilized to authenticate received control signals, as well as ensure that those signals have not been impermissibly alerted in transit. As such, communications between the mobile devices 105 and platform 101 and platform 101 may include various identifiers, keys, random numbers, random handshakes, digital signatures, and the like.

Figure 3:
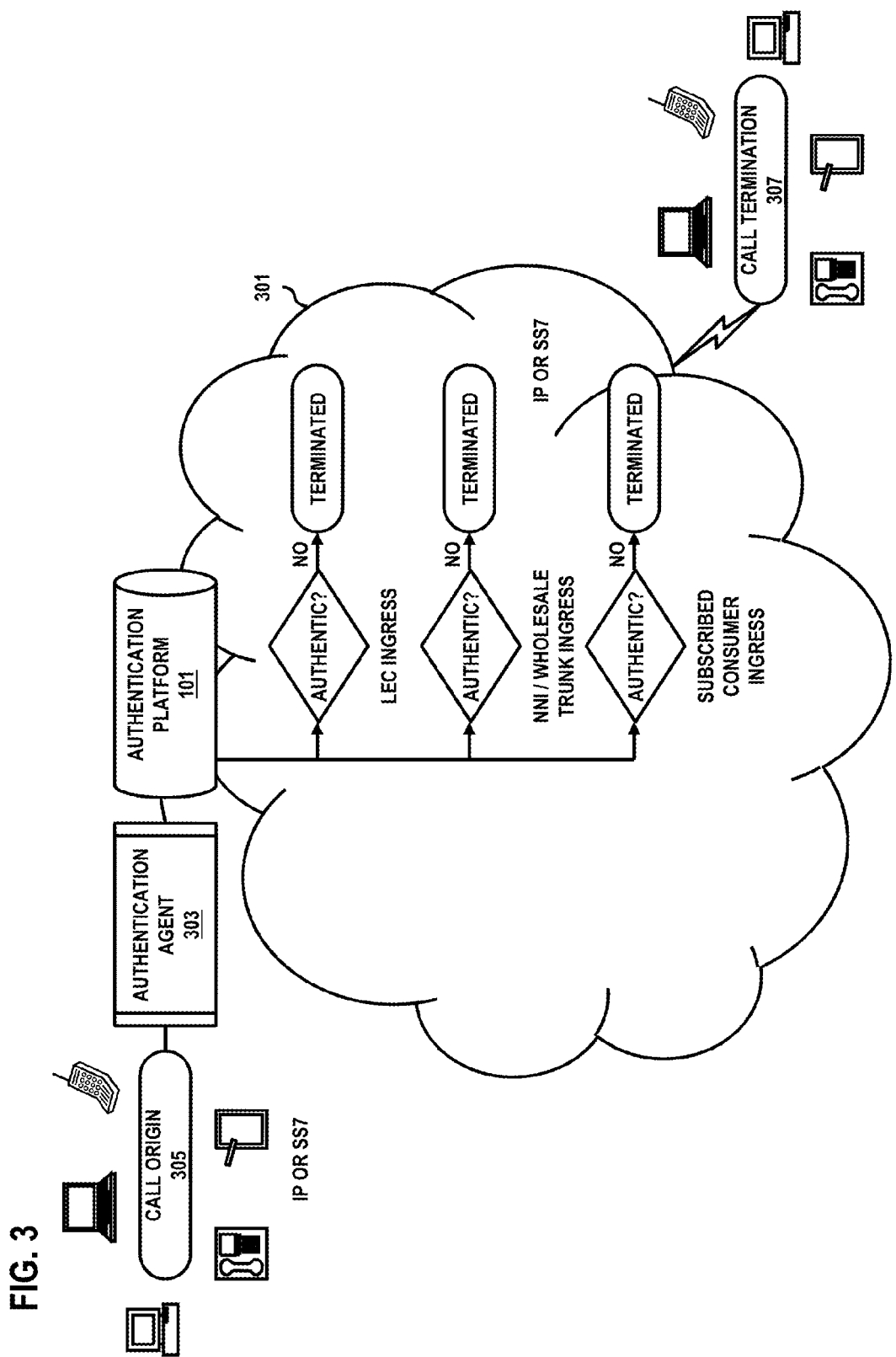
FIG. 3 is a diagram of components of an signaling network for authenticating directory information, according to exemplary embodiments.

By way of example, FIG. 3 is a diagram of components of a signaling network 301 (e.g., one or more networks 107-113), according to exemplary embodiments. As illustrated, FIG. 3 includes the network 301, an authentication agent 303, platform 101, origin device 305, and termination device 307.

The agent 303 may be software implemented, for instance, in the device 305 and/or in a device connected to the device 305. For example, the agent 303 is implemented in a device at a customer's residence connected between an RJ11 box connected to the network 301 and device 305 (e.g., a voice station). As shown the devices 305 and 307 may be a mobile device 105b, voice station 123, computing device 117, and the like, using various packet based or switch based protocols such as, for instance, VoIP, IP, SIP, SS7, and the like.

As illustrated, the agent 303 receives a request to initiate a voice communication session and forwards the request with verification information corresponding with directory information specifying the origin device 305. Next, the platform 101 authenticates the directory information based on the verification information. As shown, the authentication platform 101 authenticates the directory information at an ingress point of network 301, at a network-to-network interface (NNI) and/or a wholesale trunk ingress of network 301, a subscribed consumer ingress, or a combination thereof. By way of example, the authentication platform 101 causes network 301 to send a message to the device 305 indicating the call is not authorized and deny further requests when the verification is not authenticated.

Figure 4:
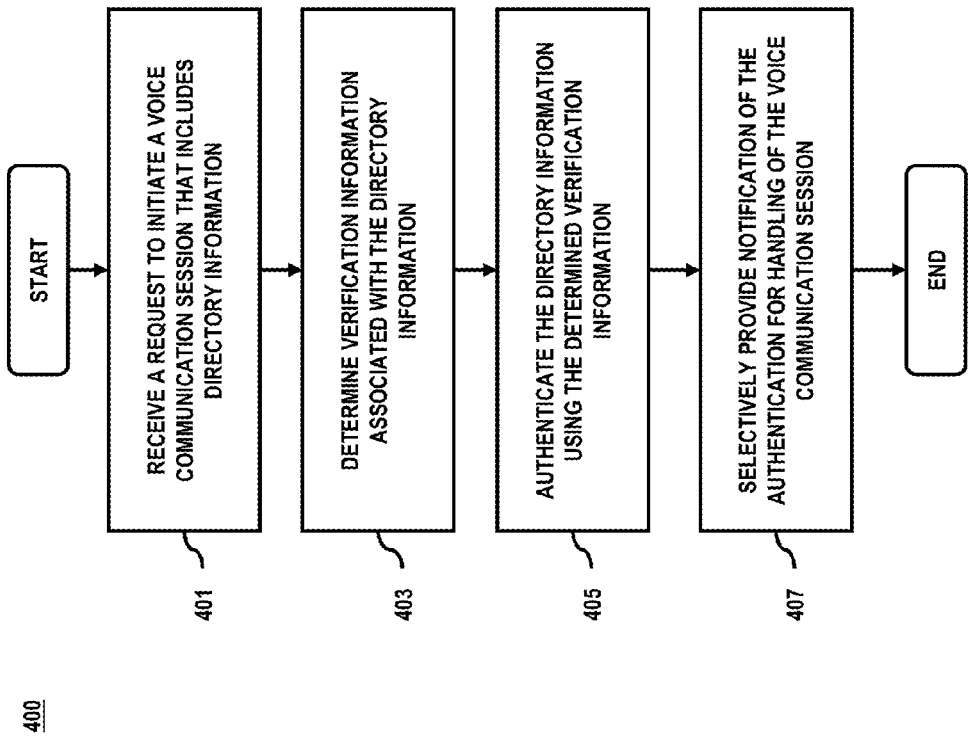
FIG. 4 is a flowchart of a process for authenticating directory information utilizing a platform, according to one embodiment.

FIG. 4 is a flowchart of a process for authenticating directory information utilizing a platform, according to one embodiment. For illustrative purpose, process 400 is described with respect to the systems of FIGS. 1, 2, and 3. It is noted that the steps of process 400 may be performed in any suitable order, as well as combined or separated in any suitable manner.

In step 401, the communication interface 211 receives a request to initiate a voice communication session over a signaling network that includes directory information specifying origination of the voice communication session. For instance, mobile device 105a sends a request to initiate the communication session to wireless network 111 which forwards the request to the communication interface 211 for authentication. Next, in step 403, the platform 101 determines verification information associated with the directory information. For instance, the registration module 203 retrieves verification information from the registered number database 121 to correspond with directory information of the request. Alternatively or additionally, the request module 205 obtains verification information from the request. For instance, the request module 205 may decrypt an encoded key with a key designated by a service provider. The authentication module 207, then, as in step 405, authenticates the directory information using the determined verification information. By way of example, the authentication module 207 compares the verification information retrieved from the registered number database 121 with verification information of the request. Additionally, or alternatively, the authentication module 207, compares the decrypted key with verification information in registered number database 121. Next, in step 407, the notification module 209 selectively provides notification of the authentication for handling of the voice communication session. For instance, the notification module 209 allows the request to be forward through an ingress to and/or a trunk of one or more networks 107-113 and to forward the request to a call termination (e.g., 307). Additionally, or alternatively, the notification module 209 causes a call termination (e.g., 307) to display an indication of the authentication, for instance, by modifying the request to include authentication information.

Figure 5:
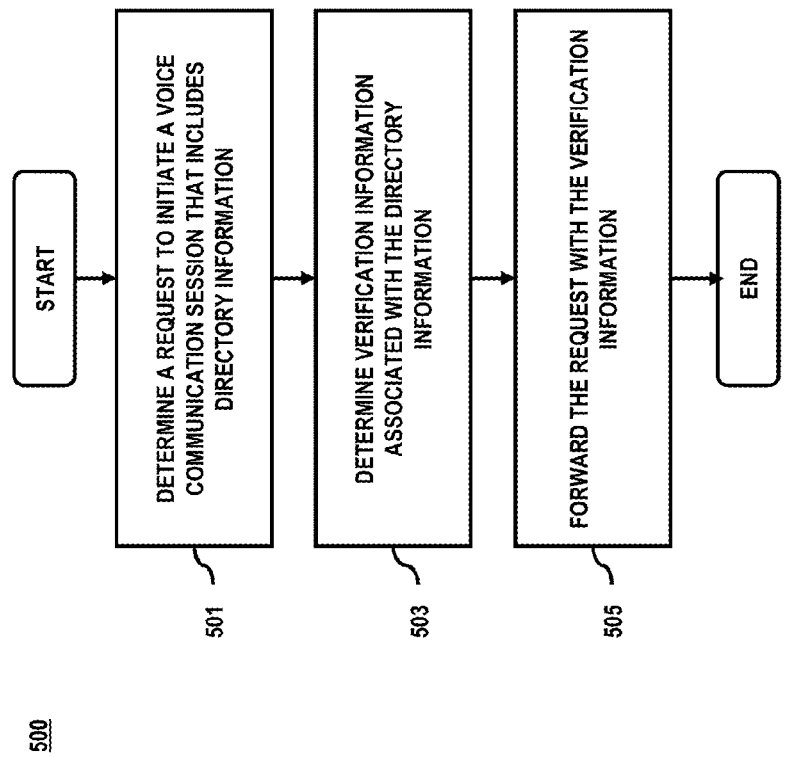
FIG. 5 is a flowchart of a process for authenticating directory information utilizing an agent, according to one embodiment.

FIG. 5 is a flowchart of a process for authenticating directory information utilizing an agent, according to one embodiment. For illustrative purpose, process 500 is described with respect to the systems of FIGS. 1, 2, and 3. It is noted that the steps of process 500 may be performed in any suitable order, as well as combined or separated in any suitable manner.

In step 501, the agent 303 determines a request to initiate a voice communication session that includes directory information. For instance, mobile device 105a sends a request to the agent 303 to initiate the communication session to wireless network 111 which forwards the request to the communication interface 211 for authentication. Next, in step 503, the agent 303 determines verification information associated with the directory information. For instance, the agent 303 continually retrieves verification information from the registered number database 121 to correspond with directory information of the request. Alternatively or additionally, the agent 303 encodes a first key for the directory information with a second key designated for a service provider. The agent 303, then, as in step 505, forwards the request with the verification information. For instance, the agent 303 injects the verification information in an initiation for handling of the voice communication session, and sends the request with the injected verification information to the platform 101.

Figure 6:
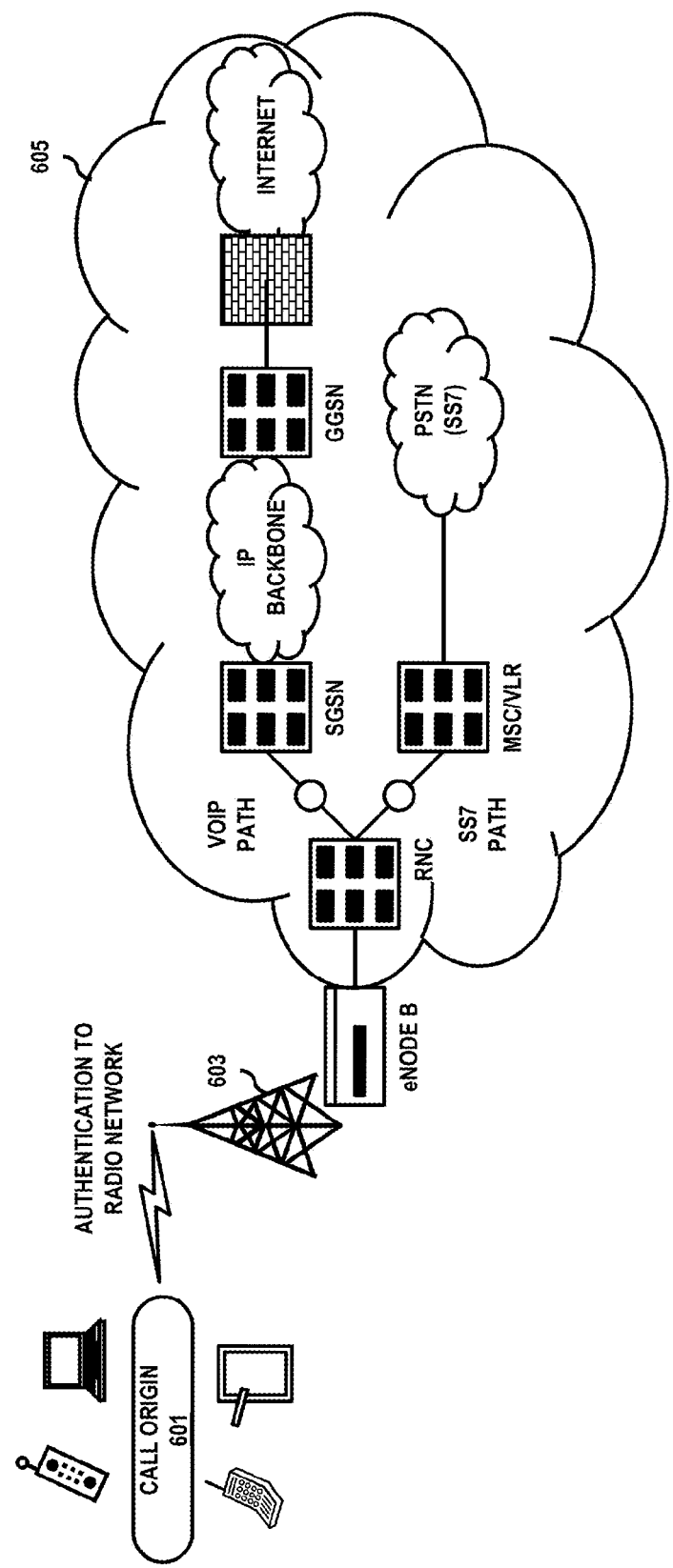
FIG. 6 is an illustration of one embodiment of authenticating directory information using authentication to a trusted network, according to one embodiment.
Figure 7:
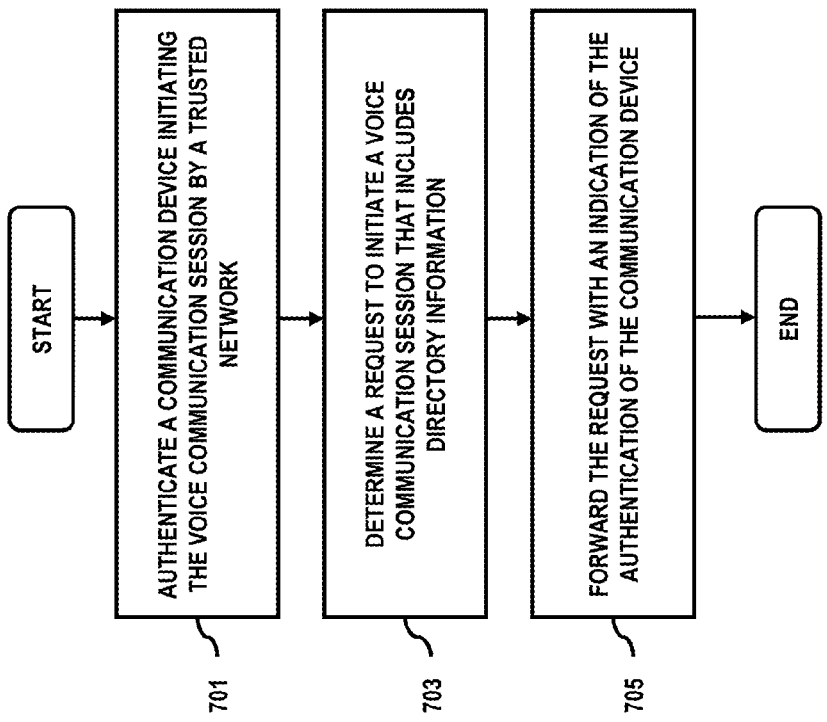
FIG. 7 is a flowchart of a process for authenticating directory information using authentication to a trusted network, according to one embodiment.

FIG. 6 is an illustration of one embodiment of authenticating directory information using authentication to a trusted network, according to one embodiment. For illustrative purpose, process 700 of FIG. 7 is described with respect to the systems of FIG. 6. It is noted that the steps of process 700 may be performed in any suitable order, as well as combined or separated in any suitable manner. The system 600 includes a call origin 601 (e.g., 305), authenticating network 603, and one or more networks 605. By way of example, the call origin 601 authenticates, as in step 701, with the network 603. For instance, the network 603 may be a trusted radio network (e.g., 3G, 4G, LTE, CDMA2000, etc.) utilizing one or more various secure protocols, such as, for instance, a walsh code, a hadamard code, Walsh-Hadamard code, etc., that are continually modified. As shown, the networks 603 and 605 are configured to support various protocols, such as SS7, VoIP, voice over LTE (VOLTE), etc., and various devices, such as, radio network controller (RNC), a serving general packet radio service (GPRS) support node (SGSN), Gateway GPRS support node (GGSN), Mobile Switching Center (MSC), Visitor Location Register (VLR), public switched telephone network (PSTN) and the like. As such, devices able to connect with the trusted radio network may be, based on the ability to connect, authenticated. Furthermore, such devices may be associated by the network 603 with directory information. As such, the network 603 may determine, as in step 703, a request by the call origin 601 to initiate a voice communication session, and forward, as in step 705, the request with an indication of the authentication of the communication device (e.g., 601). For instance, the network 603 may append the request itself with verification information and forward to the platform 101. Additionally, or alternatively, the network 603 may indicate the authentication of the device separately from the request. By way of example, the network 603 forwards the request using the one or more networks 605 and sends a signal using a service provider network 113 to the platform 101 indicating the authentication of the device and the request. As such, the authentication of the device may be utilized by, for instance, the platform 101 to authenticate directory information of requests by the device.

Figure 8A:
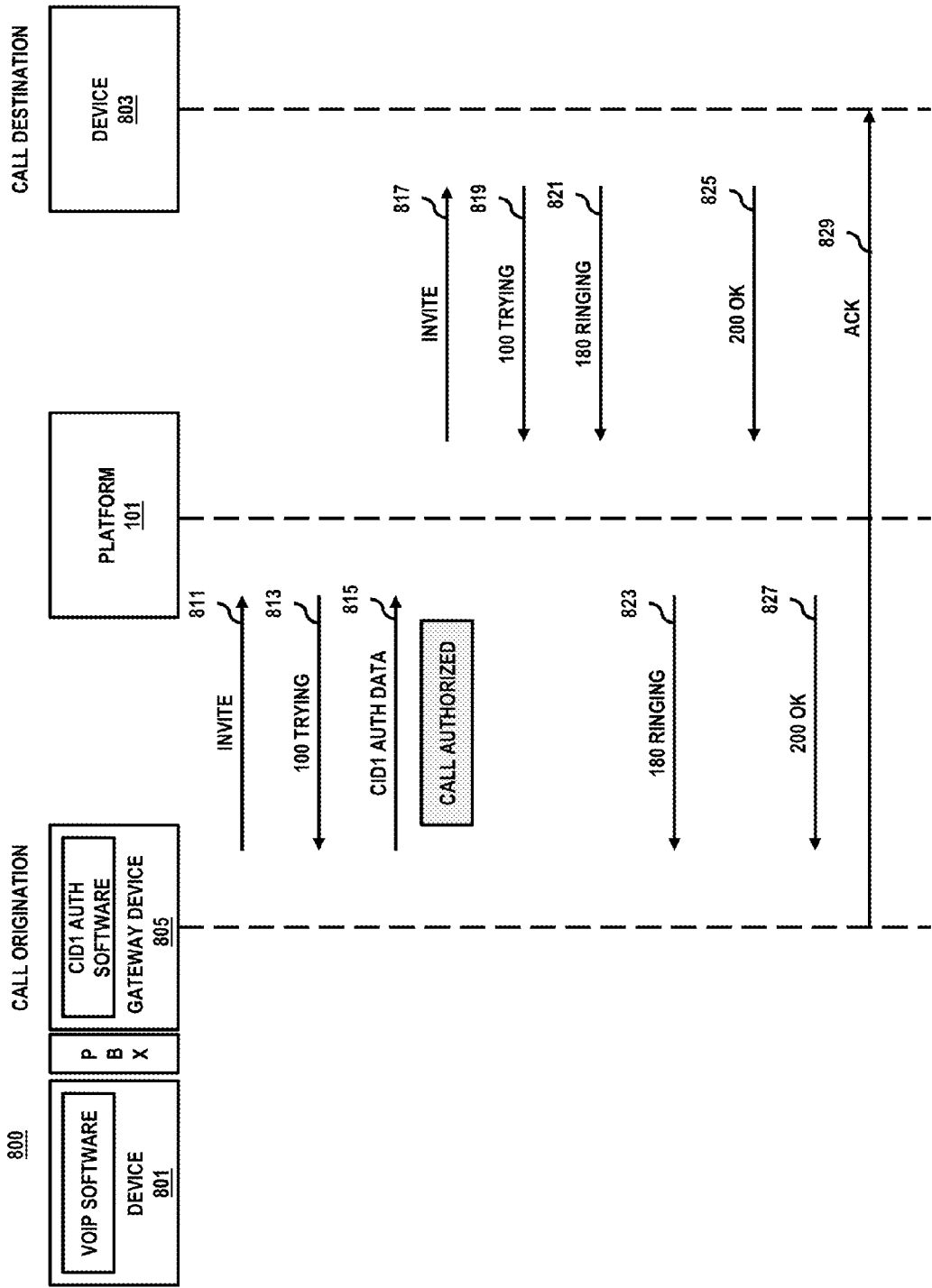

FIGS. 8A and 8B are ladder diagrams illustrating an exemplary system utilizing VoIP, according to exemplary embodiments. For illustrative purpose, FIGS. 8A and 8B are described with respect to the system 100 of FIG. 1 and the platform 101 of FIG. 2. As shown, FIGS. 8A and 8B illustrate a system 800 including devices 801 and 803, and platform 101. As shown the devices 801 and 803 may be a mobile device 105b, voice station 123, computing device 117, and the like.

Adverting to FIG. 8A, the system further includes a gateway device 805 configured to register directory information for the device 801 with the platform 101 and receive verification information from the platform 101. As shown the device 801 and the gateway device 805 are connected by a private branch exchange (PBX). The device 801 may be instead directly connected to the gateway device 805 or the device 801 may be configured to perform the functionality of the gateway device 805 and thus, the PBX and the gateway device 805 may be omitted. As shown, the gateway device 805 includes a pre-loaded key (e.g., CID3) to determine a cipher that is continually updated by LECs.

In step 811, the gateway device 805 (or device 801), using VoIP, transmits an invite for a communication session that includes calling directory information (e.g., a telephone number of device 801 and a P-asserted ID) and a called directory information (e.g., a telephone number of device 803) that is encrypted using the cipher. Next, in step 813, the platform 101, at an ingress of one or more networks (e.g., 107-113, 301, etc.), responds to the gateway device 805 with a 100 trying, which indicates an attempt to establish the communication session. The gateway device 805, in step 815, transmits verification information encrypted by the cipher, for instance, a "caller ID" key (CID1) for the telephone number of device 801) to the platform 101. In one embodiment, the verification information is injected in an initiation sequence of the voice communication session. The platform 101 then decrypts the encrypted directory and verification information using a key (e.g., CID2). Once the platform 101 authenticates the communication session, it forwards, in step 817, the invite to device 803, which responds, in steps 819 and 821, with a trying 100, and a 180 ringing, respectively. In one example, the device 803 indicates that the calling directory information is authenticated according to an indication received from the platform 101. The platform 101 and/or one or more networks 107-113 then forwards, in step 823, the 180 ringing back to the gateway device 805. In step 825, the device 803 detects an indication to establish the communication session (e.g., a user answers a call), and sends a 200 OK to the platform 101, which forwards, in step 827, the 200 OK indicating a port to the gateway device. The gateway device 805 then acknowledges, in step 829, the 200 OK, and the communication session is established by the one or more networks 107-113 using the port.

Adverting to FIG. 8B, the system further includes a hacking device 807 rather than the gateway device 805. The device 801 may be instead be configured to perform the functionality of the hacking device 807 and thus, the hacking device 807 may be omitted. As shown, the hacking device 807 attempts to establish a communication session similarly to the gateway device 805, except that rather than including registered verification information, the hacking device 807 sends, in step 831, no (e.g., null) verification information or incorrect verification information (e.g., previous or expired set of credentials). As such, the platform 101 and/or one or more networks 107-113, rejects the request and sends, in step 833, a 401 unauthorized message (e.g., "call cannot be completed as dialed") back to the hacking device 807. In one example, the platform 101 denies the request at an ingress to one or more networks 107-113 (e.g., a signaling network), thereby preventing the hacking device 807 from accessing the one or more networks 107-113. In another example, the platform 101 denies the request at an ingress to a trunk of the one or more networks 107-113, thereby preventing the hacking device 807 from accessing the trunk of the one or more networks 107-113. In yet another example, the platform 101 denies the request at an ingress to the device 803, thereby preventing the hacking device 807 from accessing the device 803.

FIGS. 9A and 9B are ladder diagrams illustrating an exemplary system the utilizing SS7 protocol, according to exemplary embodiments. For illustrative purpose, FIGS. 9A and 9B are described with respect to the system 100 of FIG. 1 and the platform 101 of FIG. 2. As shown, FIGS. 9A and 9B illustrate a system 900 including devices 901 and 903, and platform 101. As shown the devices 901 and 903 may be a mobile device 105b, voice station 123, computing device 117, and the like.

Adverting to FIG. 9A, the system further includes a gateway device 905 configured to register directory information for the device 901 with the platform 101 and receive verification information from the platform 101. As shown the device 901 and the gateway device 905 are directly connected. The device 901 may instead be connected via a PBX or the device 901 may be configured to perform the functionality of the gateway device 905 and thus, the PBX and the gateway device 905 may be omitted. As shown, the gateway device 905 is configured to calculate a key (e.g., CID3) based on a serial number and to determine a cipher that is continually updated by LECs using the calculated key.

In step 911, the gateway device 905 (or device 801) using the SS7 protocol transmits an initial address message (IAM) for a communication session that includes calling directory information (e.g., a telephone number of device 901 801 and an ANI value) and a called directory information (e.g., a telephone number of device 903) that is encrypted using the cipher. Next, in step 913, the gateway device 905 transmits encrypted verification information to the platform 101. The platform 101 then decrypts the encrypted directory and verification information using a key (e.g., CID2). Once the platform 101 authorizes the communication session, the platform 101, the one or more networks 107-113, a SS7 to VoIP gateway, or a combination thereof forwards, in step 915, the invite to device 903, which responds, in step 917, with a trying 100, a 180 ringing (step 919), and a 200 ok (step 921). The platform 101, the one or more networks 107-113, a SS7 to VoIP gateway, or a combination thereof then sends, as in steps 923 and 925, an acknowledgment (ACK) to the device 903 and an answer message (ANM), respectively.

Adverting to FIG. 9B, the system 900 includes a hacking device 907 rather than the gateway device 905. The device 901 may be instead be configured to perform the functionality of the hacking device 907 and thus, the hacking device 807 may be omitted. As shown, the hacking device 907 attempts to establish a communication session similarly to the gateway device 905, except that rather than including registered verification information, the hacking device 907 sends no (e.g., null) verification information or incorrect verification information. As such, the platform 101, rejects the request and the platform 101, the one or more networks 107-113, a SS7 to VoIP gateway, or a combination thereof sends, in step 931, a transaction capabilities application part (TCAP) error message back to the hacking device 807.

Figure 10:
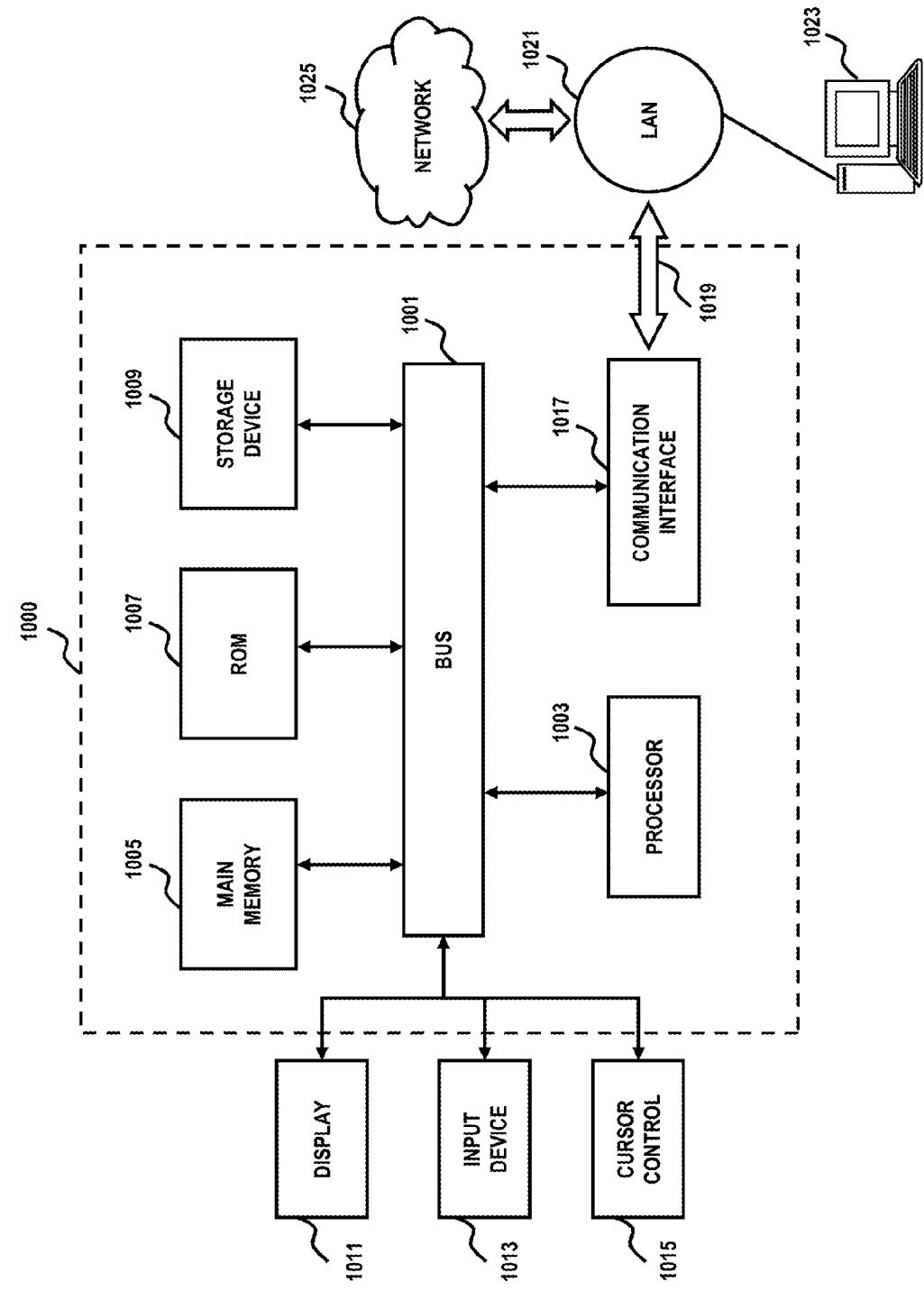
FIG. 10 is a diagram of a computer system that can be used to implement various exemplary embodiments.

FIG. 10 is a diagram of a computer system that can be used to implement various exemplary embodiments. The computer system 1000 includes a bus 1001 or other communication mechanism for communicating information and one or more processors (of which one is shown) 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk, flash storage, or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. Additional output mechanisms may include haptics, audio, video, etc. An input device 1013, such as a keyboard including alphanumeric and other keys, is coupled to the bus 1001 for communicating information and command selections to the processor 1003. Another type of user input device is a cursor control 1015, such as a mouse, a trackball, touch screen, or cursor direction keys, for communicating direction information and command selections to the processor 1003 and for adjusting cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multiprocessing arrangement may also be employed to execute the instructions contained in main memory 1005. In alternative embodiments, hard-wired circuitry may be used in place of or in combination with software instructions to implement embodiments of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to computer-readable storage medium ((or non-transitory)—e.g., non-volatile media and volatile media), and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 11 illustrates a chip set or chip 1100 upon which an embodiment of the invention may be implemented. Chip set 1100 is programmed to enable authentication of directory information as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of enabling authentication of directory information.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to enable authentication of directory information. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving a request to initiate a voice communication session over a signaling network that includes a data network, the request including directory information specifying origination of the voice communication session, the request including an encrypted first key value;
decrypting the encrypted first key value with a second key value;
determining verification information associated with the directory information;
comparing the decrypted first key value with the verification information;
authenticating the directory information using the determined verification information and the comparison, wherein the authentication is performed at an ingress point of the signaling network; and
selectively providing notification of the authentication for handling of the voice communication session.

2. The method according to claim 1, further comprising:
retrieving the verification information from the request.

3. The method according to claim 1, further comprising:
accessing a designated repository to obtain the verification information.

4. The method according to claim 1, further comprising:
determining a communication device initiating the voice communication session is authenticated by a trusted network that is different from the signaling network,
wherein the device and the trusted network are directly connected, and
wherein the authentication of the directory information is further based on the determination of the communication device.

5. The method according to claim 1, further comprising: denying access to the signaling network without the verification information associated with the directory information.

6. An apparatus comprising:
at least one processor; and
at least one memory including computer program code for one or more programs,
the at least one memory and the computer program code configured to, with the at least one processor, cause the apparatus to perform at least the following,
receive a request to initiate a voice communication session over a signaling network that includes a data network, the request including directory information specifying origination of the voice communication session, the request further including an encrypted first key value;
decrypt the encrypted first key value with a second key value;
determine verification information associated with the directory information;
compare the decrypted first key value with the verification information;
authenticate the directory information using the determined verification information and the comparison, wherein the authentication is performed at an ingress point of the signaling network; and
selectively provide notification of the authentication for handling of the voice communication session.

7. The apparatus according to claim 6, wherein the apparatus is further caused to:
retrieve the verification information from the request.

8. The apparatus according to claim 6, wherein the apparatus is further caused to:
access a designated repository to obtain the verification information.

9. The apparatus according to claim 6, wherein the apparatus is further caused to:
determine a communication device initiating the voice communication session is authenticated by a trusted network that is different from the signaling network,
wherein the device and the trusted network are directly connected, and
wherein the authentication of the directory information is further based on the determination of the communication device.

10. The apparatus according to claim 6, wherein the apparatus is further caused to: deny access to the signaling network without the verification information associated with the directory information.

11. A method comprising:
determining a request to initiate a voice communication session over a signaling network that includes a data network, the request including directory information specifying origination of the voice communication session;
receiving a first key value for the directory information and a second key for the signaling network;
encrypting the first key value with a second key value;
determining verification information associated with the directory information wherein the verification information is based on the encrypted first key value; and
forwarding the request with the verification information,
wherein the directory information is authenticated using the verification information,
wherein the authentication is performed at an ingress point of the signaling network, and
wherein a notification of the authentication for handling of the voice communication session is selectively provided.

12. The method according to claim 11, further comprising:
receiving the verification information from the signaling network.

13. The method according to claim 11, wherein the forwarding of the request further comprises:
injecting the verification information in an initiation for handling of the voice communication session.

14. The method according to claim 11, further comprising: denying access to the signaling network without the verification information associated with the directory information.

15. An apparatus comprising:
at least one processor; and
at least one memory including computer program code for one or more programs,
the at least one memory and the computer program code configured to, with the at least one processor, cause the apparatus to perform at least the following,
determine a request to initiate a voice communication session over a signaling network that includes a data network, the request including directory information specifying origination of the voice communication session;
receive a first key value for the directory information and a second key for the signaling network;
encrypt the first key value with a second key value;
determine verification information associated with the directory information, wherein the verification information is determined based on the encrypted first key value; and
forward the request with the verification information, wherein the directory information is authenticated using the verification information, wherein the authentication is performed at an ingress point of the signaling network, and wherein a notification of the authentication for handling of the voice communication session is selectively provided.

16. The apparatus according to claim 15, wherein the apparatus is further caused to:

receive the verification information from the signaling network.

17. The apparatus according to claim 15, wherein the forwarding of the request further comprises injecting the verification information in an initiation for handling of the voice communication session.

18. The apparatus according to claim 15, wherein the apparatus is further caused to: deny access to the signaling network without the verification information associated with the directory information.

* * * * *